April 12, 1966 R. H. B. BUTEUX ETAL 3,245,261
TEMPERATURE MEASUREMENT OF PLASTIC FILM
Filed Oct. 31, 1962 2 Sheets-Sheet 1

INVENTORS
RICHARD HAROLD BARCLAY BUTEUX
HARRY ARTHUR WILLIS
By Cushman, Darby & Cushman
ATTORNEYS April 12, 1966  R. H. B. BUTEUX ETAL  3,245,261
TEMPERATURE MEASUREMENT OF PLASTIC FILM
Filed Oct. 31, 1962  2 Sheets-Sheet 2

INVENTORS
RICHARD HAROLD BARCLAY BUTEUX
HARRY ARTHUR WILLIS
By
Cushman, Darby & Cushman
ATTORNEYS 3,245,261
TEMPERATURE MEASUREMENT OF
PLASTIC FILM
Richard Harold Barclay Buteux and Harry Arthur Willis,
Welwyn Garden City, England, assignors to Imperial
Chemical Industries Limited, London, England, a corporation of Great Britain
Filed Oct. 31, 1962, Ser. No. 234,357
Claims priority, application Great Britain, Nov. 7, 1961,
39,849/61
11 Claims. (Cl. 73—355)

This invention relates to a method of testing applicable to the manufacture of plastic films which require heating steps during the course of their manufacture. It relates also to apparatus for such a method of testing.

In processes for the manufacture of plastic films such as films of polyethylene terephthalate and other linear polyester films, polyolefine films such as polypropylene films, polythene films, films of 4-methyl-penetene-1 and the like and films of vinyl polymers such as vinylidene chloride copolymer films, it is often necessary to heat a film either in order to obtain a suitable temperature for stretching to orient it or to heat set it. In orientation processes it is particularly desirable that heating should bring the film to a temperature which is uniform across it since non-uniformities tend to cause uneven stretching and it has long been desirable to be able to measure the temperature of a moving film at selected portions of it. A moving plastic film has small thermal capacity and conductivity so its temperature cannot be measured by use of a normal measuring device such as a thermometer, a thermo-couple or bolometer placed in good thermal contact with it. Also the generation of frictional heat between a temperature detector and a moving film and variable thermal contact between the detector and the film would interfere with the operation of the former. Moreover, radiation pyrometers of a conventional type cannot be used since their response to the very small amount of radiation emitted from such a film, would be swamped by interfering radiation for other sources, for instance, surrounding hot bodies and infra-red heaters where infra-red heating is used.

We have appreciated that there is appreciable emission from a plastic film in the infra-red at wave-lengths corresponding to its infra-red absorption, and that if taking advantage of this, an infra-red measuring instrument sensitive only to a relatively narrow range of wave-lengths or group of wave-lengths encompassing the strong absorption band or bands of the film (and therefore the strong emission band or bands of the film) is used, a large amount of the interfering radiation can be excluded from the measurement.

Accordingly, the invention consists in a method of measuring the temperature of a plastic film by radiation pyrometry, particularly applicable to temperature measurement of moving plastic films during their manufacture or treatment, in which the infra-red emission from the film is measured substantially only over a range or group of wave-lengths of strong emission, by means of an infra-red measuring instrument which is sensitive only to those wave-lengths.

Figure 1:
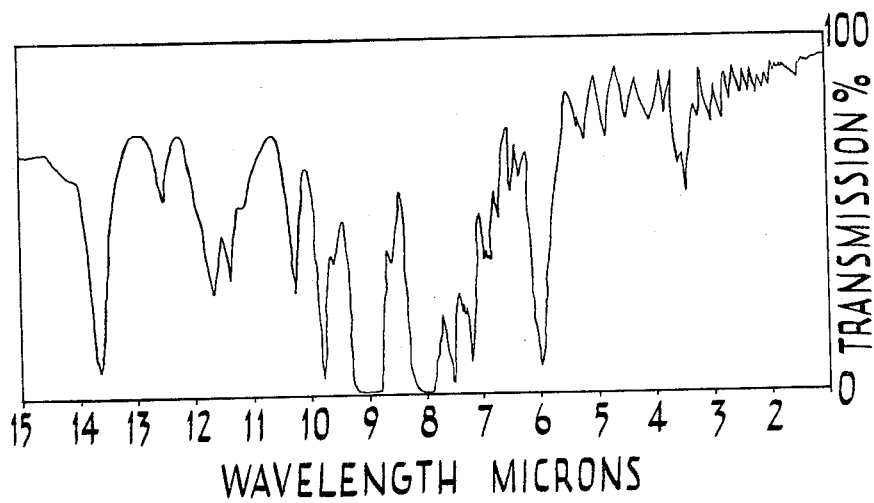
FIGURE 1 is a graph in which percent transmission is plotted versus wavelength for polyethylene terephthalate film.

According to the invention, there may be employed an infra-red measuring instrument which has been adapted to be sensitive only to a range of wave-lengths, such as, in the case of polyethylene terephthalate, a range of wave-lengths between about 5.5 microns and about 10 microns (reference is made to FIGURE 1 of the accompanying drawings which is an infra-red spectrum for bi-axially oriented and heat set polyethylene terephthalate film). In such a case, the film does not act as a black-body emitter and interfering radiation is to some extent transmitted through it. The emission of the film therefore is to some extent dependent on the thickness of the film to be measured as well as upon its temperature. Consequently a measuring instrument used in this way will have to be calibrated for the particular thicknesses of film whose temperature is to be measured and care will be needed to exclude as much interfering radiation as possible: therefore, in accordance with a preferred feature of this invention, the infra-red emission is measured only at a relatively narrow range or a group of wave-lengths at which the radiation is substantially completely absorbed by the material of the films. The result is that at these wave-lengths the film substantially behaves as a black-body emitter even when it is of small thickness. Thus the emission energy at these wave-lengths is independent of the thickness of the film.

Black-body emitters or radiators are known to be radiators which completely absorb all the radiation energy which falls on them so that no energy is either reflected or transmitted. In the case of a plastic film where the only wave-lengths measured are those where there is substantially complete absorption, the only factor which detracts from the behaviour of the film as a black-body emitter is the reflection from the film. This reflection factor is a constant for the particular film used and is not normally affected by changing the thickness of the film; also it can be taken account of in the calibration of the measuring instrument. The energy at particular wave-lengths emitted by a black-body emitter is expressed by Planck's Law the equation for which is $$J = \frac{Ac_1 \lambda^{-5}}{e^{c_2/\lambda T} - 1}$$

where J is the spectral radiant intensity in watts/steradian centimetres for radiation of wave-length $\lambda$ of a black-body source. A is the area of the source in square centimetres, $c_1 = 3.7402 \times 10^{-12}$ watts per square centimetre, $C_2 = 1.43848$ centimetre degrees and T is the temperature in ° Kelvin. This expression is mentioned by way of explanation only, since in practice the instrument will normally be calibrated using films at known temperatures rather than by using the theoretical expression to derive the energy which ought to fall on the instrument at a particular temperature.

In a preferred mode of operating the invention the infra-red measuring instrument is placed on the opposite side of the film to any source of infra-red radiant heat (such as may come from an infra-red or a radiant heater which is used to heat the film at some stage in its manufacture or treatment) so that this interfering radiation is at least partially absorbed by the film at the emission wave-lengths to be measured. The film thereby acts as its own filter for the removal of the interfering radiation.

According to Lambert's Law the interfering radiation will not be wholly absorbed but depending on the thickness of the film all but a very small fraction of this interfering radiation may be absorbed. Nevertheless in the case where, for example, an infra-red heater is used to apply heat to the film while it is moving during the course of its manufacture or treatment and an infra-red measuring instrument placed on the opposite side of the film to said heater is used to measure the temperature of the film in accordance with our invention, the heater will emit far more energy than the film. The very small fraction referred to above may therefore still be of some importance, and for this reason a stop is preferably placed behind the lens system of the instrument, the image of the infra-red heater is thrown on to it and residual interfering radiation is thereby prevented from interfering with the measurement. The use of a stop is described below with reference to the drawings.

Of course, the infra-red measuring instrument could be placed on the same side of the film as such an interfering source but then care would have to be taken that reflections from, for instance infra-red heaters, did not direct interfering radiation into the instrument (or if they did, stops would have to be provided to absorb this radiation). Stated broadly, in a preferred method of applying our invention to measuring the temperature of film while it is being heated by a source of infra-red radiant heat, an image of said source is focussed on to stop means which absorbs the radiation from said source, said stop means being located so as to prevent said radiation from reaching the heat-sensitive means of said instrument.

Our invention is particularly useful in its application to the measurement of the temperature of a plastic film while it is being stretched, either longitudinally or transversely or in both directions simultaneously, or alternatively while a biaxially stretched plastic film is being heat set.

An application of our invention to measuring the temperature of a plastic film while it is being stretched in the longitudinal direction under the influence of infra-red radiant heat is now illustrated with reference to FIGURE 2 of the accompanying drawings.

Figure 2:
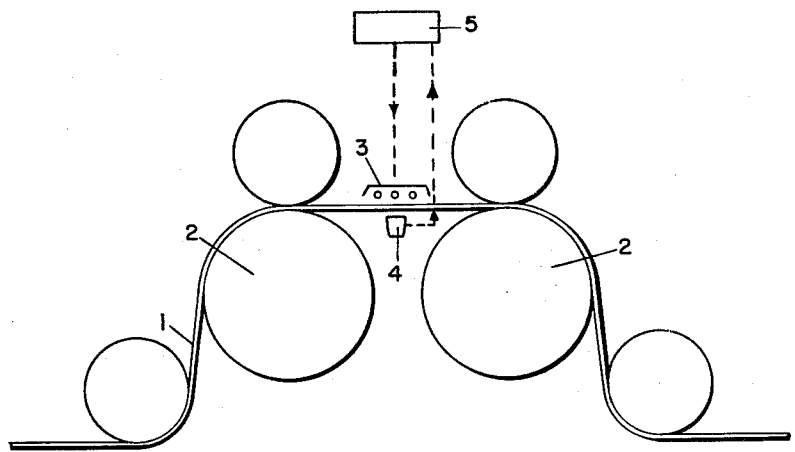
FIGURE 2 is a schematic view illustrating a method and apparatus for measuring the temperature of a plastic film being stretched in the longitudinal direction.

In FIGURE 2 a film 1 is passed between two sets of nip rollers 2 and stretched between them in the longitudinal direction while being heated to the stretching temperature by means of an infra-red heater 3. On the opposite side of the film to the infra-red heater 3, an infra-red measuring instrument 4 which is sensitive only to a range of wave-lengths totally absorbed by the film measures the emission from the film at those wave-lengths and from this measurement the temperature of the film is ascertained. The measuring instrument 4 is traversed across the film from one edge to the other and thereby the temperature distribution across the film can be ascertained. In order to obtain a uniform temperature across the stretched film or any temperature distribution which is required, a temperature signal from the measuring instrument 4 as it traverses the film may be fed to amplifying and controlling devices 5 which in turn control the heat output of sections of the infra-red heater 3 across the width of the film.

The infra-red measuring instrument could be used similarly to measure the temperature of a film in the stenter oven, either where it is being stretched transversely in such an oven or where it is being heat set in such an oven. The temperature distribution across the film or along its length may be determined during transverse stretching or heat setting, as in the case of longitudinal stretching described above, and some degree of automatic control of the temperature may be introduced if desired by moving the infra-red measuring instrument across or along the film as it is required and feeding back the measurement signal through an appropriate amplifying and control device to control the temperature at various parts of the stenter oven.

The invention herein not only consists in a radiation pyrometry method of measuring the temperature of a plastic film but also in certain infra-red radiation intensity measuring instruments for use in such methods.

Such instruments may have a detector/filter system adapted to be sensitive only to a desired range or group of wave-lengths and to be pre-set for such ranges or groups which are chosen in accordance with infra-red emission characteristics of the film to be measured.

Thus the film may be a polyolefine film such as a polyethylene, polypropylene, polybutene-1 or poly-4-methyl pentene-1 film; a linear polyester film such as a film of polythylene terephthalate or polycyclohexane dimethanol terephthalate; a polyamide film; a vinyl chloride or vinylidene chloride polymer or copolymer film; a rubber hydrochloride film; a cellulose derivative film; or a polyvinyl fluoride or other vinyl film.

In this connection it is a theoretical possibility to use a conventional infra-red spectrometer as the measuring instrument and to calculate the temperature from the intensity determined using such a spectrometer. However, conventional spectrometers have a very narrow wave-length aperture (they measure only intensities over a very narrow band of wave-lengths). Consequently, such an instrument is too insensitive in general for the purposes of this invention, in addition to being unduly cumbersome.

In accordance with the invention the infra-red measuring instrument is sensitive over a relatively narrow range range of wave-lengths (usually no more than about 5 microns wide) or to a group of wave-lengths (usually no more than about 5 microns apart) but not a very narrow range as is conventional with spectrometers nor to a very wide range of wave-lengths as is usual with conventional infra-red gas analysis instruments. By way of explanation, a conventional spectrometer may have a wave-length aperture of 0.05 microns, whereas an instrument in accordance with the present invention preferably has a wave-length aperture of at least 0.1 micron, so that sufficient radiant energy is received into the instrument. Moreover, the instrument in accordance with the invention (for purposes of simplicity) is pre-set for at least one of the ranges or groups of wave-lengths chosen in accordance with the infra-red emission characteristics of the film to be measured. If the instrument is to be used for more than one film, it may be arranged to inter-change either the detector or the filter systems or both of them so that different desired pre-set ranges or groups of wave-lengths may be measured in accordance with the film whose temperature is to be ascertained.

An example of a pre-set infra-red measuring instrument having a detector/filter system which is pre-set to the desired range of wave-lengths is an instrument having a "Luft" detector containing a gas having one or more absorption bands in its infra-red spectrum which coincide with at least one strong emission band of the film whose temperature is to be measured. Such a measuring instrument may conveniently be a single beam instrument in which one half of the "Luft" cell is covered over while a measuring beam containing the emitted radiation from the film whose temperature is being measured is admitted through a transparent window to the other half of the "Luft" cell, the two gas chambers comprising the halves of the cell being separated by a pressure-sensitive diaphragm and the gas in both chambers having an infra-red absorption spectrum with a band or bands in coincidence with at least one strong emission band of the film whose temperature is to be measured. Because the measuring beam contains emitted radiation from the film whereas the blanked off half of the cell receives no emitted radiation, the gas on the measuring side is heated more than the gas on the other side of the "Luft" detector and the resulting pressure change causes a deflection of the diaphragm between the two chambers and the amount of "emitted" energy in the measurement beam can now be ascertained from the deflection of this diaphragm.

Alternatively, such an instrument may be used as a double beam instrument, for instance using an optical wedge in the measurement beam and a standard temperature comparison source in a reference beam, the wedge being moved until a detector shows no difference in intensity between the energies in the beams at the desired wave-lengths. The advantage of using such an instrument is that as in the case of double beam infra-red spectrophotometers, amplifier drift is avoided.

A radiation pyrometry method of measuring the temperature of a film of polyethylene terephthalate passing through a stenter using a single beam measuring instrument in accordance with the invention having a "Luft" detector is now illustrated with reference to FIGURE 3 of the accompanying drawings.

Figure 3:
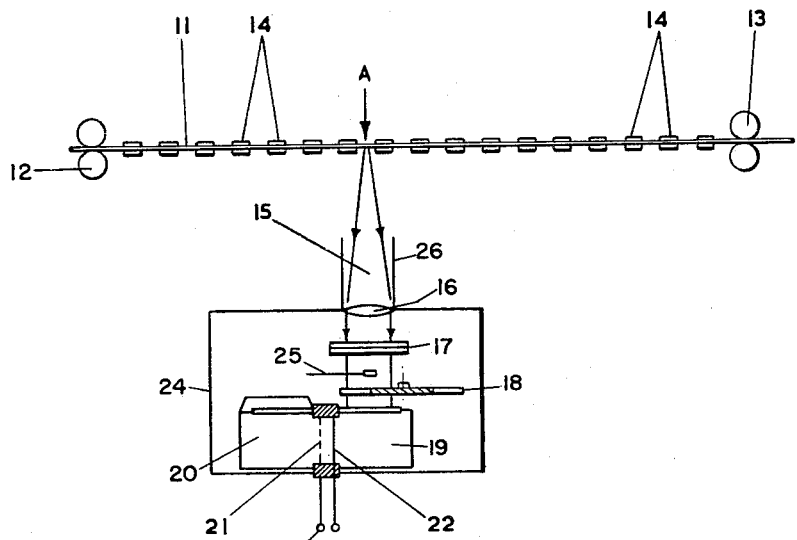
FIGURE 3 is a schematic view illustrating a method and apparatus for measuring the temperature of a plastic film using a particular type of measuring instrument.

In FIGURE 3 a film 11 of polyethylene terephthalate (which has been oriented in the longitudinal direction only) is passed through a stenter and is stretched transversely and then heat set. The end rollers of the stenter are shown diagrammatically as 12 and 13 and the clips of the stenter are shown diagrammatically as 14.

To measure the temperature of the film 11 at a point A where transverse stretching ceases and heat setting of the film commences, a measuring beam 15 is passed through a lens 16 and a filter system 17 comprising a layer of indium antimonide (which absorbs all wave-lengths shorter than about 7 microns) combined with a sheet of mica (which absorbs all wave-lengths longer than about 9 microns). The measuring beam then passes through an aluminium vaned rotating chopper 18 and into one half of the "Luft" cell 19, both halves being filled with nitrous oxide. The other half of the "Luft" cell 20 is blanked off. The "Luft" cell has a thin aluminium diaphragm 22 and a thin aluminium mesh 21 separated from each other by a short gap. Increase in pressure in the measuring side of the cell resulting from the absorption of extra energy due to emission from position A on the film 11 causes the diaphragm to be moved towards the aluminium mesh 24 and the electrical capacity between the two to change and because the chopper 18 is rotated, the cell generates an alternating current (at for instance 13 cycles per second controlled by the speed of rotation of the chopper) which is taken off at terminals 23 to an appropriate 13 cycles per second amplifier and display instrument. A stop 25 is situated behind the lens 16 to absorb any interfering radiation from beyond the film and the whole instrument is mounted in a thermostated enclosure to prevent drift in its calibration.

Nitrous oxide is used as the gas since it has in its infra-red spectrum a strong absorption band at about 8 microns which thus coincides with a strong emission band of the polyethylene terephthalate film. By way of explanation, a polypropylene film might for instance have its temperature measured using an aliphatic hydrocarbon gas in the "Luft" cell since this would have a similar infra-red characteristic. However with polypropylene up to its melting point the radiation curve maximum (which of course depends on the temperature of the film) is at about 10 microns and is remote from the main polypropylene absorption band of 3.4 microns. Consequently although such a "Luft" cell might be used, it would have only a rather low sensitivity and powerful amplifiers would then be needed for operation of the instrument. In the case of polyethylene terephthalate, the radiation curve maximum corresponds closely with the strong emission bands of the material and this factor allows the facile use of a "Luft" cell. For films such as polypropylene the more sensitive instrument now described is more appropriate.

In a further form of infra-red radiation intensity measuring instrument for use in the method of this invention, which is particularly preferred because of its simplicity and sensitivity and because of its possibility of application to any plastic film including polypropylene film, the filter system is adapted to be sensitive only to a desired range or group of wave-lengths and comprises a rotating chopper through which the radiation to be measured is passed. The chopper is constructed so that alternately the radiation is substantially unfiltered by it and is then filtered through a material forming part of it which material has an infra-red absorption spectrum having one or more bands which coincide with at least one strong emission band of the film whose temperature is to be measured.

The beam before or after chopping is preferably passed through absorption filters and thereafter it is passed to a radiation detector.

The radiant energy, emitted from the film whose temperature is being measured, is detected by the detector when the chopper is not filtering the beam and is prevented or substantially prevented from reaching the detector when the beam has to pass through the material forming part of the chopper. Consequently, as in the "Luft" cell instrument, the detector produces an electrical output at a frequency controlled by the speed of rotation of the chopper and the intensity of the output is proportional to the energy emitted at the desired range or group of wave-lengths by the film. The signal from the detector is amplified by a tuned amplifier tuned to the output frequency of the detector and is then taken to a display instrument from which the temperature of the film after suitable calibration is read off.

Figure 4:
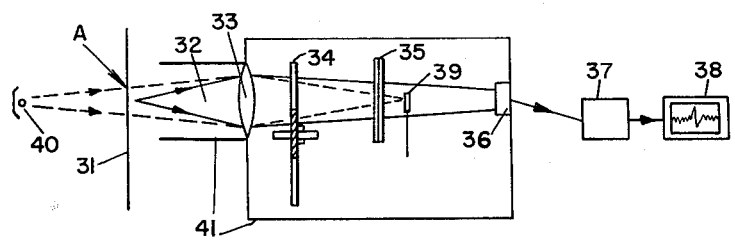
FIGURE 4 is a schematic view illustrating a method and apparatus for measuring the temperature of a plastic film using another type of measuring instrument.

Such an infra-red measuring instrument is described diagrammatically with reference to FIGURE 4 of the accompanying drawings.

In FIGURE 4 the film 31 has its temperature measured at A and the beam 32 from A is taken to the lens 33 and a chopper 34 is rotated to give a signal frequency of 13 cycles per second. The beam then passes through absorption filter 35 to a thermopile 36, the electrical signal at 13 cycles per second from the thermopile 36 is fed to the amplifier 37 tuned to amplify only at 13 cycles per second and is then passed after amplification to the display instrument 38. The optical components of the instrument are enclosed in an enclosure 41 which is thermostatted so that temperature changes of the instrument are not allowed to case changes in calibration and which also provide a hood for the lens 33. A stop 39 is placed to absorb any radiation which may pass through the film from, for instance an infra-red heater 40, the image of which is focussed by the lens 33 onto the stop.

Figure 5:
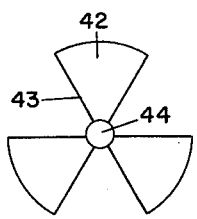
FIGURE 5 is a fragmentary view of part of the apparatus of FIGURE 4.

The chopper is further illustrated with reference to FIGURE 5 in which sheets of film 42 are suspended on wire frames 43 connected to a hub 44. Preferably the film 42 is a sample of the film whose temperature is being measured, so that it has the same infra-red absorption characteristics. It need not, however, be of the same material; for instance, an oriented film might have its temperature measured while the film 42 is made merely from material which is the same chemically as the film whose temperature is being measured but, for instance, it might not be oriented; alternatively a film of material may be used which has at least one infra-red absorption band in coincidence with a strong emission band of the film whose temperature is being measured, the strong emission band being in the region defined by the filter 35.

The absorption filter 35 is chosen to allow only a range of wave-lengths to pass through it, which range encompasses the strong emission band or bands of the film 31. For polyethylene terephthalate film, as with the "Luft" cell instrument described above, the filter may be indium antimonide combined with mica to pass only wave-lengths from about 7 to about 9 microns. For polypropylene film it is preferred to use a photo-emissive or a photo-conductive cell in place of the thermopile 36, since such a cell may have a sensitivity which cuts off at wave-lengths longer than about 3.5 microns and in this way a large amount of interfering radiation can be eliminated.

In a yet further form of infra-red measuring instrument the "Luft" cell arrangement of FIGURE 3 is used in conjunction with a chopper of the type used in the arrangement of FIGURE 4. In this way a highly selective "Luft" cell instrument is obtained which is very suitable for use with polyethylene terephthalate and like films whose strong infra-red adsorption bands are in the region 7 to 12 microns.

The present invention therefore also comprises apparatus suitable for carrying out the method of our invention, said apparatus comprising means for directing the beam containing the emitted radiation from the film whose temperature is being measured on to heat-sensitive means, a first filter means and a second filter means each adapted to intercept said radiation before it strikes said heat-sensitive means, said first filter means being adapted to pass only a range or group of wave-lengths which encompass a strong emission band of the film, said second filter means being adapted to absorb, over a series of discrete periods of time only, substantially only the wave-lengths of said strong emission band and means for converting changes in temperature in said heat-sensitive means into a series of electrical signals, whereby the difference in magnitudes of successive signals are proportional to the amount of energy emitted by the film in said strong emission band. The said second filter means may conveniently comprise a plurality of vanes carried on a shaft that is adapted to be rotated so that each of said vanes in succession interrupt the path of said radiation for discrete periods of time, the material of said vanes having substantially the same infra-red absorption characteristics over said range or group of wave-lengths as the film whose temperature is being measured. Preferably the said second filter means comprises film of the same material as the film whose temperature is being measured.

It also comprises alternative apparatus suitable for carrying out the method of our invention comprising means for directing the beam containing the emitted radiation from the film whose temperature is being measured on to heat-sensitive means, a first filter means and a second filter means through each adapted to intercept said radiation before it strikes said heat-sensitive means, said first filter means being adapted to pass only a range of group of wave-lengths which encompass a strong emission band of the film, said second filter means being adapted to absorb, over a series of discrete periods of time only, substantially all the said wave-lengths and means for converting changes in temperature in said heat-sensitive means into a series of electrical signals, whereby the differences in magnitudes of successive signals are proportional to the amout of energy emitted by the film over said range or group of wave-lengths. In such an apparatus the said second filter means may comprise a plurality of vanes carried on a shaft that is adapted to be rotated so that each of said vanes in succession interrupt the path of said radiation for discrete periods of time, the material of said vanes being substantially impermeable to the said range or group of wave-lengths.

The heat-sensitive means means may conveniently comprise a thermopile. Alternatively, it may comprise a "Luft" cell consisting of two chambers each filled with a gas having a strong absorption band substantially coincident with the said strong emission band, means being provided for directing said emitted radiation into one only of said chambers, said chambers being separated by a pressure-sensitive diaphragm adapted to be deflected by changes in pressure of the gas in the chamber receiving said emitted radiation, said diaphragm constituting one plate in an electrical capacitor the capacity of which is adapted to vary in accordance with deflections imparted to said diaphragm and there being also means for converting variations in said capacity into variations in an electrical output signal.

We claim:

1. In a method of heating a plastic film with a source of infra-red radiant heat and measuring the temperature of the plastic film by radiation pyrometry which comprises measuring the infra-red emission from the film substantially over a group of wave-lengths of strong emission at which the radiation is substantially completely absorbed by the material of the film and using an infra-red measuring instrument incorporating a radiant energy sensitive means which is sensitive only to those wave-lengths the improvement which comprises passing the infra-red emission from the film through a filter system comprising a first means which transmits only said group of wave-lengths and periodically interrupting its path of travel to said radiant energy sensitive means by a second means which absorbs substantially at least said group of wave-lengths, said improvement further comprising focusing an image of said infra-red radiant source onto stop means which absorbs the radiation from said source, said stop means being located so as to prevent said radiation from reaching said radiant energy sensitive means.

2. A method according to claim 1 in which the temperature of the film is measured while it is moving during the course of its manufacture.

3. A method according to claim 1 in which the temperature of the film is measured while it is being stretched.

4. A method according to claim 1 in which the infra-red measuring instrument is placed on the opposite side of the film from said source of radiant heat, so that radiation from the latter is at least partially absorbed by the film at the emission wave-lengths to be measured.

5. In a method of measuring the temperature of a plastic film by radiation pyrometry which comprises heating the plasitc film with a source of infra-red radiation, simultaneously measuring the infra-red emission at which the radiation is substantially completely absorbed by the material of the film and using an infra-red measuring instrument incorporating a radiant energy sensitive means which is sensitive only to those wave-lengths, the improvement which comprises passing the infra-red emission from the film through a filter means which transmits only said group of wave-lengths and subsequently periodically interrupting for discrete periods of time the path of travel to said radiant energy sensitive means by moving a series of spaced apart filter elements in succession across said path, the material of said filter elements having substantially the same infra-red absorption characteristics over said group of wave-lengths as the film, said improvement further comprising focusing an image of said infra-red source onto stop means which absorbs the radiation from said source, said stop means being located so as to prevent said radiation from reaching the heat-sensitive means of said instrument.

6. A method according to claim 5 in which the material of said filter elements are film of the same material as that of the film whose temperature is being measured.

7. Apparatus for measuring the temperature of a plastic film comprising means for directing a beam containing the emitted radiation from the film onto radiant energy sensitive means, a filter system comprising a first means and a second means each adapted to intercept said radiation before it strikes said radiant energy sensitive means, said first means being adapted to pass only a group of wave-lengths which encompass a strong emission band of the film, said second means comprising a plurality of vanes carried on a shaft that is adapted to be rotated so that each of said vanes in succession interrupt the path of said radiation for discrte periods of time, the material of said vanes having substantially the same infra-red absorption characteristics over said group of wave-lengths as the film so that said second means absorbs over a series of discrete periods of time only, substantially only the wave-lengths of said strong emission band, and means for converting any changes in properties of said radiant energy sensitive means caused by said radiation into a series of electrical signals, whereby the differences in magnitudes of successive signals are proportional to the amount of energy emitted by the film in said strong emission band.

8. Apparatus according to claim 7 in which said vanes are made of the same material as the film.

9. Apparatus according to claim 7 further including a source of infra-red radiant heat for heating the film and a stop means onto which an image of said source is focused, said stop means absorbing the radiation from the said source and located in a position preventing said radiation from reaching the radiant energy sensitive means of said instrument.

10. Apparatus according to claim 7 in which the radiant energy sensitive means is a thermopile.

11. Apparatus according to claim 7 in which the radiant energy sensitive means comprises two chambers each filled with a gas having a strong absorption band, substantially coincident with the said strong emission band, means for directing said emitted radiation into one only of said chambers, said chambers being separated by a pressure sensitive diaphragm adapted to be deflected by changes in pressure of the gas in the chamber receiving said emitted radiation, said diaphragm constituting one plate in an electrical capacitor, the capacity of which is adapted to vary in accordance with deflections imparted to said diaphragm and means for converting variations in said capacity into variations in an electrical output signal.

References Cited by the Examiner

UNITED STATES PATENTS

| | | | |
|---|---|---|---|
| 2,909,924 | 10/1959 | Flook | 73—355 |
| 2,951,939 | 9/1960 | Luft | 260—83.3 |
| 2,977,477 | 3/1961 | Rosi | 250—83.3 |
| 2,982,856 | 5/1961 | Camp | 250—86 |
| 3,026,413 | 3/1962 | Taylor | 250—83.3 |
| 3,095,506 | 6/1963 | Dewey | 250—83.3 |

RALPH G. NILSON, *Primary Examiner.*

JAMES W. LAWRENCE, *Examiner.*